US008656686B2

(12) United States Patent
Smith

(10) Patent No.: US 8,656,686 B2
(45) Date of Patent: Feb. 25, 2014

(54) UP-CUT NET KNIFE FOR AGRICULTURAL BALER

(75) Inventor: Kevin M. Smith, Narvon, PA (US)

(73) Assignee: CNH America LLC, New Holland, PA (US)

( * ) Notice: Subject to any disclaimer, the term of this patent is extended or adjusted under 35 U.S.C. 154(b) by 741 days.

(21) Appl. No.: 12/691,899

(22) Filed: Jan. 22, 2010

(65) Prior Publication Data

US 2011/0179750 A1 Jul. 28, 2011

(51) Int. Cl.
*B65B 11/04* (2006.01)

(52) U.S. Cl.
USPC .......... 53/216; 53/397; 53/399; 53/203; 53/211; 493/370; 83/352; 83/444

(58) Field of Classification Search
USPC ........... 53/397, 399, 409, 430, 118, 116, 203, 53/204, 210, 211, 216; 493/340, 370; 83/352, 444

See application file for complete search history.

(56) References Cited

U.S. PATENT DOCUMENTS

| | | | |
|---|---|---|---|
| 4,599,844 A * | 7/1986 | Clostermeyer et al. ......... | 53/118 |
| 4,802,395 A | 2/1989 | Merritt, III et al. | |
| 5,129,207 A | 7/1992 | Butler | |
| 5,216,873 A * | 6/1993 | Ratzlaff et al. ................. | 53/587 |
| 5,259,167 A * | 11/1993 | Underhill et al. ............... | 53/118 |
| 5,479,767 A * | 1/1996 | McClure et al. ................ | 56/343 |
| 5,557,906 A | 9/1996 | Viaud | |
| 5,581,973 A * | 12/1996 | Underhill ........................ | 53/118 |
| 5,581,976 A | 12/1996 | Underhill | |
| 5,692,365 A | 12/1997 | Meyer et al. | |
| 6,021,622 A * | 2/2000 | Underhill ........................ | 53/118 |
| 6,164,050 A | 12/2000 | Vande Ryse et al. | |
| 6,233,913 B1 | 5/2001 | Roth et al. | |
| 6,295,797 B1 | 10/2001 | Naaktgeboren et al. | |
| 6,644,006 B1 | 11/2003 | Merritt et al. | |
| 6,688,092 B2 | 2/2004 | Anstey et al. | |
| 6,722,100 B1 * | 4/2004 | Underhill ........................ | 53/118 |
| 6,877,304 B1 | 4/2005 | Smith et al. | |
| 6,886,307 B2 * | 5/2005 | Viaud et al. .................... | 53/118 |
| 6,928,792 B1 | 8/2005 | Viesselmann et al. | |
| 7,065,942 B2 | 6/2006 | Viaud | |
| 7,181,900 B2 | 2/2007 | Hood et al. | |
| 2009/0272072 A1 | 11/2009 | Paillet et al. | |

FOREIGN PATENT DOCUMENTS

| | | |
|---|---|---|
| DE | 19539297 | 4/1997 |
| EP | 1595443 A1 | 5/2005 |

\* cited by examiner

*Primary Examiner* — Christopher Harmon
(74) *Attorney, Agent, or Firm* — Patrick M. Sheldrake

(57) ABSTRACT

An improved net cutting assembly that may be used with an agricultural baler net wrapping system. More particularly, an up-cut net knife for improved cutting of wrapping material (e.g., a net) used to wrap bales of crop material in an agricultural baler. The up-cut net knife assembly improves net cutting performance by providing an up-cut net knife that moves in the same direction as the net whereby the motion of the net helps the knife get into the cut position. Further, embodiments of the up-cut knife assembly move the up-cut knife cutting edge at substantially the same speed and in the same direction as the net to be cut. This motion of the up-cut knife allows the up-cut knife to be lifted up into the net motion using a driver and then to continue on with no relative motion—or at least minimal relative motion of the knife to the net—until the knife gets into the cut position. In the cut position, the knife stops and the net is pulled against the knife blade resulting in cutting the net.

8 Claims, 13 Drawing Sheets

UP-CUT NET KNIFE FOR AGRICULTURAL BALER

TECHNOLOGY FIELD

The present invention relates generally to a net cutting assembly for an agricultural baler net wrapping system, and more particularly, to an up-cut net knife for improved cutting of net used to wrap bales of crop material in a round baler.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, pickups of the baler gather the cut and windrowed crop material from the ground then convey the cut crop material into a bale-forming chamber within the baler. A drive mechanism operates to activate the pickups, augers, and a rotor of the feed mechanism. A conventional baling chamber may consist of a pair of opposing sidewalls with a series of belts that rotate and compress the crop material into a cylindrical shape.

When the bale has achieved a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

One of the critical features on a round baler net wrapping system is the knife. In order to produce an ideal round bale package, a uniform cut is desired across the entire width of the net. In addition to improving the appearance of the bale, a clean cut also reduces the risk of loose net ends being caught in moving parts of the baler. Conventional balers require a high-speed impact cut to create a clean cut. This method of cutting requires considerable energy be used to accelerate the knife bar to an acceptable cutting speed and is also very dependent on adequate net tension to achieve a uniform cut.

Conventional net knives move in an opposite direction to the direction of net motion. In this conventional configuration, the net motion acts to hold the knife out of the cut position and requires a lot of net tension in order to effectively cut the net. The opposite direction of travel of the knife and net also may result in an uneven or ragged cut. This can result in the net starting to tear as soon as the knife touches the net and the net may not tear evenly across the entire surface of the bale. For example, a few strands may be cut early and then a few strands may be cut later on.

A net cutting solution is needed that is not sensitive to net tension and also requires less energy to perform the net cutting. A net cutting configuration that facilitates the movement of the knife into the net and the cut position is also desirable.

SUMMARY

Embodiments of the present invention address and overcome one or more of the above shortcomings and drawbacks, by providing an up-cut net knife assembly that does not require high speed or high impact to cut the net. The up-cut net knife bar uses the motion of the net going onto the bale to move the knife into the cut position. There is substantially no relative motion between the knife and the net as the knife moves to the cut position.

In some embodiments, the invention provides a bale wrapping system having a cutting assembly comprising an elongated knife arm rotatable about a transverse pivot axis and having an end distally located from the pivot. A knife bar extending transversely to and affixed to the distal end of the knife arm; a knife blade extending along and affixed to the knife bar, such that the knife blade defines a cutting edge facing distally substantially in the longitudinal direction of the knife arm, for contacting and eventually cutting wrapping material and a knife arm driver for moving the knife arm between a home and a cut position; wherein the knife blade and wrapping material are moving in substantially the same direction upon contact, without cutting.

In some embodiments which the bale wrapping system includes a knife arm driver which is operably coupled to a motor for facilitating movement of the knife arm driver.

In some embodiments, a knife bar extends transversely between two elongated knife arms each rotatable about a transverse pivot axis and having an end distally located from the pivot axis, wherein at least one of the knife arms is operably coupled to the knife arm driver.

In some embodiments, the knife arm is adapted for rotatable fixation to a sidewall of an agricultural baler apparatus.

In some embodiments the knife bar is further provided with a comb assembly, wherein the comb assembly has a plurality of fingers which extend beyond the cutting edge for engaging and holding the net, whereby movement of the net facilitates movement of the knife arm into the cutting position.

In some embodiments, a bale wrapping system having a cutting assembly is provided wherein first and second knife arm support plates affixing the knife assembly in the desired location in the bale wrapping system. First and second elongated knife arms, each rotatably affixed to the respective first and second knife arm supports for rotation about a transverse pivot axis and each having a distal end; a knife bar extending transversely between the distal end of each of the first and second knife arms; a knife blade extending along and affixed to the knife bar, such that the knife blade defines a cutting edge facing distally substantially in the longitudinal direction of the knife arms; and at least one knife arm driver for moving the knife arms between a lower home position and an upper cut position.

In some embodiments, the bale wrapping system further comprises a wrap dispensing apparatus for feeding wrap material rearward towards the bale; wherein the wrap is dispensed at the same approximate speed at which the knife edge is moving during its movement towards the cut position as the knife arm.

In some embodiments, a motor is operatively coupled to the knife arm driver for moving the knife arm driver and knife arm.

Some embodiments include a second motor operatively coupled thereto for simultaneously moving the second knife arm driver with the first knife arm driver.

Some embodiments provide an agricultural baler net wrapping system comprising: a net dispensing assembly comprising a net dispensing assembly and a knife assembly which work in concert to achieve a smooth cut by moving in sub stability the same direction during the cut. The net dispensing assembly comprises a supply roll comprising a cylindrical body extending transversely across the agricultural baler, the supply roll holds a net material; a duckbill for receiving net from the net roll and feeding net material into a bale chamber, the duckbill being moveable between a home position, and an insert position; one or more bale chamber rolls proximate a bale chamber for receiving net from the duckbill; each is arranged and operated such that a direction of net travel of the net is from the duckbill toward the bale chamber;

The knife assembly, comprises knife arms positioned proximate side walls of the agricultural baler, each knife arm having a knife pivot allowing the knife arm to rotate about a transverse axis, each knife arm having a distal end; a knife bar holding a knife having a cutting edge. The knife bar and knife extend transversely across the agricultural baler and are connected to the distal ends of the knife arms motor is operatively coupled to at least one of the knife arms to cause rotational movement of the up-cut knife assembly between a home position, and a cut position; such that the direction of knife travel of the knife cutting edge is in substantially the same direction as the net travel.

In some embodiments, the motion of the net helps the knife get into the cut position.

In some embodiments, upon contact, the knife blade moves at substantially the same speed as the net so that there is substantially no relative motion between the knife blade and the net until the knife gets into the cut position.

In some embodiments, when in the cut position, the knife stops and the net continues moving causing the net to shear due to relative motion of the net to the knife.

In some embodiments the invention provides an up-cut net knife assembly comprising an elongated knife arm rotatable about a transverse pivot axis and having an end distally located from the pivot axis; a knife bar extending transversely to and affixed to the distal end of the knife arm; a knife blade extending along and affixed to the knife bar, such that the knife blade defines a cutting edge facing distally substantially in the longitudinal direction of the knife arm. A knife arm driver is operatively coupled to the knife arm for rotating the knife arm about the transverse pivot axis between a lower home and an upper cut position. The rotational movement moves the knife blade and the cutting edge along an arc path about transverse pivot axis.

In some embodiments, the up-cut net knife is provided with a knife arm driver that is operably coupled to a motor for facilitating movement of the knife arm driver.

In some embodiments, the knife assembly comprises elongated knife arms each rotatable about a transverse pivot axis and having an end distally located from the pivot axis, wherein the knife bar extends transversely between the distal ends of the two elongated knife arms, and wherein at least one of the knife arms is operably coupled to the knife arm driver.

In some embodiments, the knife arm is adapted for rotatable fixation to a sidewall of an agricultural baler apparatus.

Some embodiments provide an up-cut net knife assembly comprising first and second knife arm support plates for affixing the knife assembly in the desired location first and second elongated knife arms, each rotatably affixed to the respective first and second knife arm supports for rotation about a transverse pivot axis and each having a distal end. A knife bar extends transversely between the distal end of each of the first and second knife arms. A knife blade extends along and is affixed to the knife bar, such that the knife blade defines a cutting edge facing distally substantially in the longitudinal direction of the knife arms. At least one knife arm driver is provided for moving the knife arms between a lower home position and an upper cut position.

Some embodiments provide a method of wrapping bale material in an agricultural baling apparatus, the method comprising:

positioning a knife arm having a distal knife tip in a knife arm home position;
positioning a duckbill for net dispensing in a duckbill home position; wrapping a formed bale by:
rotating the duckbill into a bale chamber to a net start position;
feeding net onto the bale;
retracting the duckbill out of the bale chamber toward the duckbill home position;
continuing to allow net to flow from the duckbill to the bale chamber; cutting the net by:
rotating a knife arm to a knife arm cut position such that upon contact the knife tip and net are moving in substantially the same direction;
stopping the knife arm at the knife arm cut position; and cutting the net.

In some embodiments, the net is deflected by the knife, then pulled against the knife resulting in cutting the net.

In some embodiments, the knife travel and net travel are at substantially the same speed, such that upon contact, there is substantially no relative movement between the knife tip and the net.

In some embodiments, during rotation of the knife arm, the net engages the knife, without cutting, facilitating moving the knife bar into the cut position.

In some embodiments, as soon as the knife stops moving with the net (i.e. the knife reaches the cut position), the net is pulled against the knife and is cut without additional net passing over the knife.

Some embodiments provide a method of cutting a net in a bale wrapping system, the method comprising:
dispensing netting material at a given speed and direction;
rotationally moving a knife blade at approximately the same speed and direction without cutting the netting material;
wherein when the knife blade is approximately perpendicular to the netting material, the knife blade stops, and the netting material is cut.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

Figure 1:
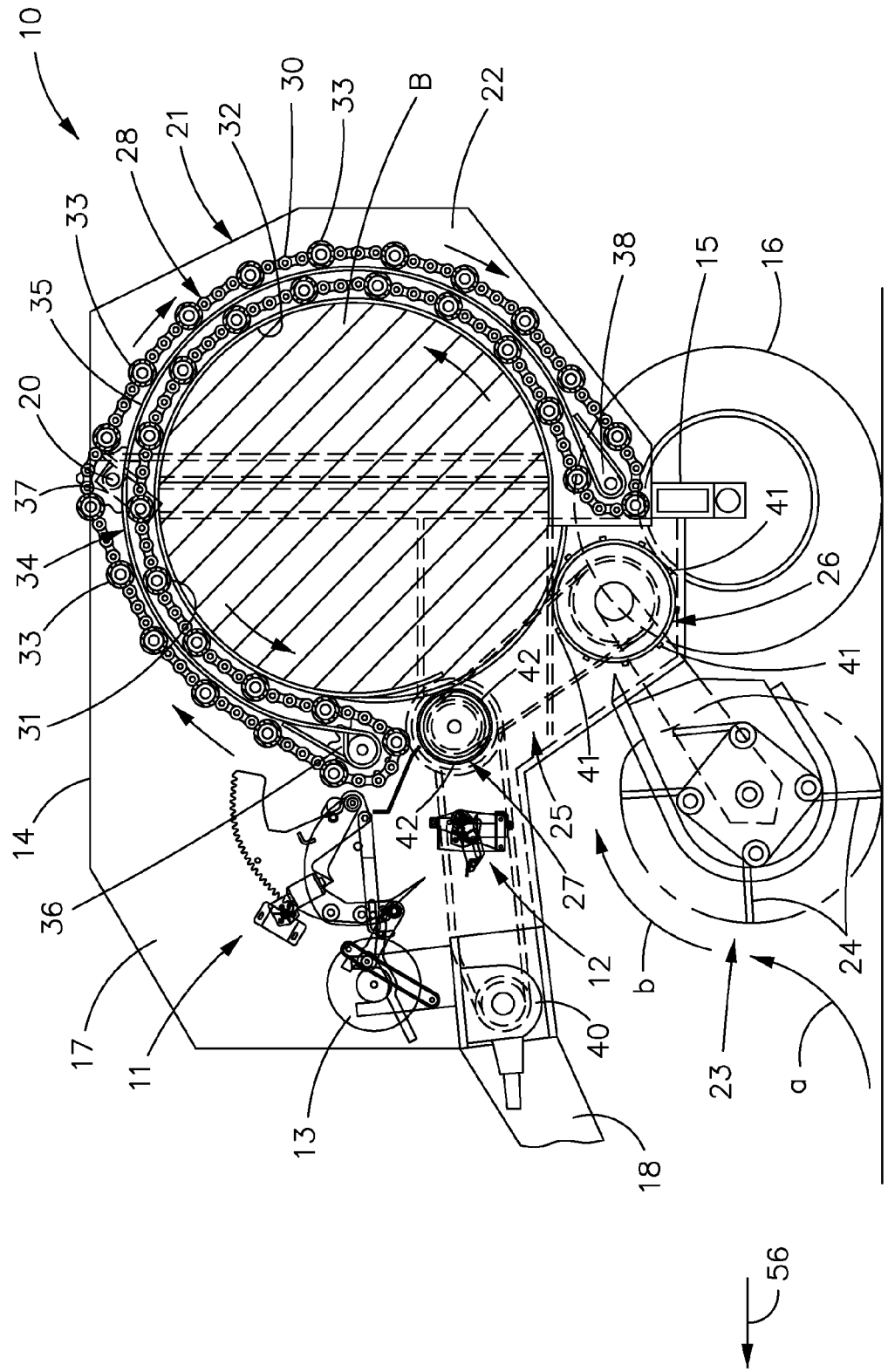
FIG. 1 is a cutaway side elevational view of an exemplary round baler in which the up-cut net knife of the present invention may be employed.

The above problems in the prior art have motivated the creation of an up-cut net knife that improves the direction of knife motion in relation to the net travel. Embodiments of the present invention provide an up-cut net knife that moves in the same direction as the net whereby the motion of the net helps the knife get into the cut position. Embodiments of the present invention provide a knife that moves at substantially the same speed as the net and in the same direction as the net so that when it is time to cut the net, the knife is lifted up into the net motion and then continues on with no relative motion—or at least minimal relative motion of the knife to the net—until the knife gets into the cut position. In the cut position, the knife stops and the net is pulled against the knife and cut without a significant amount of additional net passing over the knife. In some embodiments, substantially no additional amount of net passes over the knife once the knife stops moving. When the knife stops, the net shears because at that point in time there would be relative motion of the net to the knife, resulting in the net being pulled against the knife until it is cut.

When referring to substantially the same direction, it is meant that the net and the knife are both travelling substantially towards the baling chamber. In previous cutting assemblies, the knife blade was not travelling in substantially the same direction as the net. Rather, as seen particularly in U.S. Pat. No. 5,581,976, the knife travelled nearly perpendicularly to the net travel, making an even cut more difficult to achieve. It should be recognized, as can be seen from the drawing figures, that one or both of the knife and the net are moving rotationally—but still generally in the direction of the bale chamber, and thus in substantially the same direction.

Embodiments of the present invention are particularly well suited, but in no way limited to, use with agricultural balers. The present invention may also find utility in use with round, square, or rectangular balers, for example.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosure of which is incorporated herein by reference in their entirety. For illustrative purposes, details of an exemplary round baler in which the up-cut net knife of the present invention may be used are disclosed in and will be described, in part, with reference to U.S. Pat. No. 5,581,976, which is also hereby incorporated by reference in its entirety.

FIG. 1 depicts an exemplary agricultural round baler, generally designated 10, in which embodiments of the up-cut net knife of the present invention may be employed. As alluded to previously, the crop in the field is usually arranged in a windrow as it is engaged by the baler 10 being pulled along a windrow of cut crop material by a tractor (not shown).

FIG. 1 shows a fixed chamber round baler 10 having a wrapping system for wrapping a cylindrical package of crop material (not shown) formed in a round baler 10. More particularly, the wrapping system of baler 10 comprises a net dispensing assembly 11 and a cutting assembly 12 for cutting web material, such as net, issued from a supply roll 13.

As shown, round baler 10 includes a main frame 14 with a main support beam 15 on which a pair of wheels 16 (only one shown) are rotatably affixed. The main frame includes a pair of side walls between which a cylindrical bale forming chamber extends. For the purposes of clarity only one wall 17 is shown in FIG. 1 and the elements mounted inwardly thereof are shown in full lines for clarity, which is an approach not uncommon in the descriptions in patents. For illustrative purposes reference letter B is used to designate a bale, shown in cross section in the chamber.

Baler 10 also includes a tongue 18 extending from the forward portion of main frame 14 for conventional connection to a tractor (not shown). Pivotally connected to the sidewalls of main frame 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

As shown, the bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, of continuous cylindrical bale chamber wall. These sections, also separable during bale discharge are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

Figure 2:
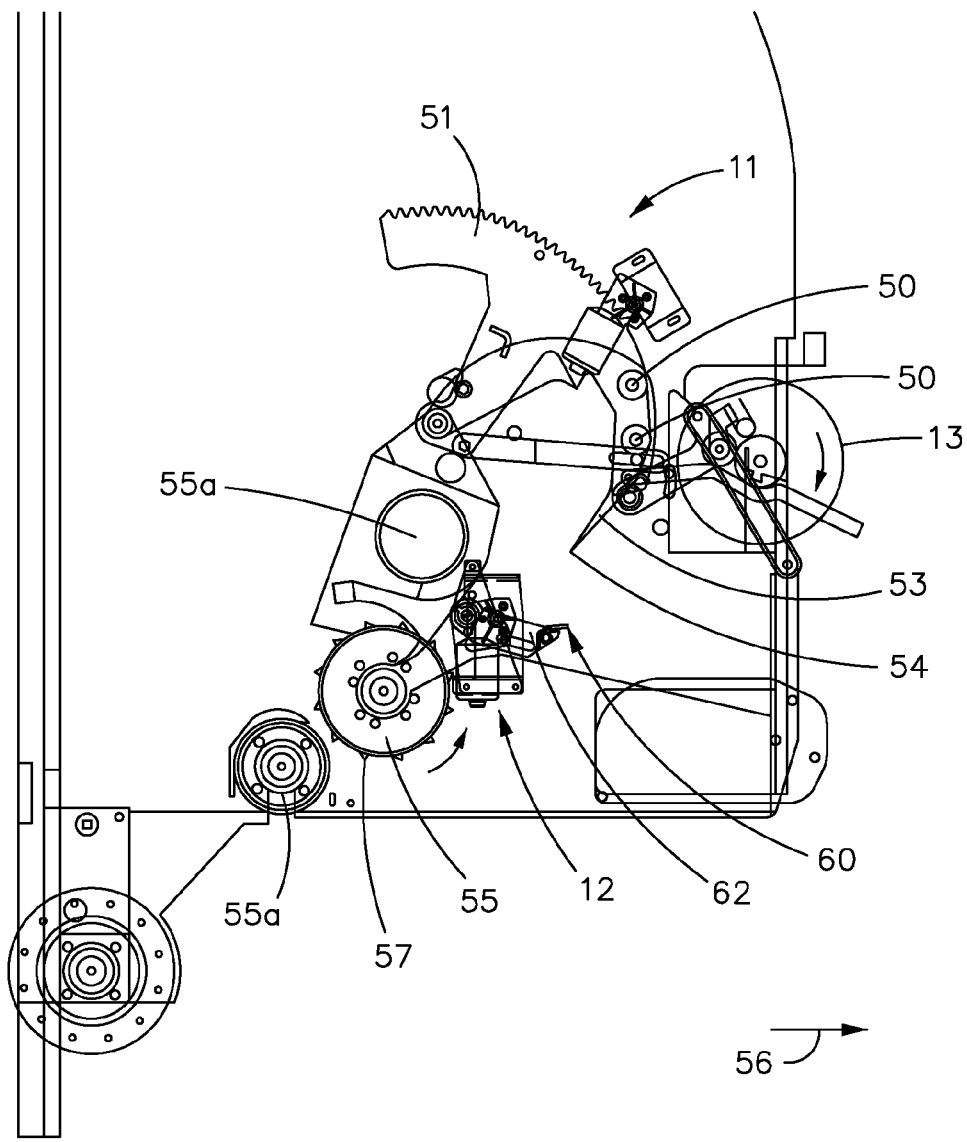
FIG. 2 shows a side view of an exemplary wrapper system and up-cut net knife assembly in the home position.
Figure 3:
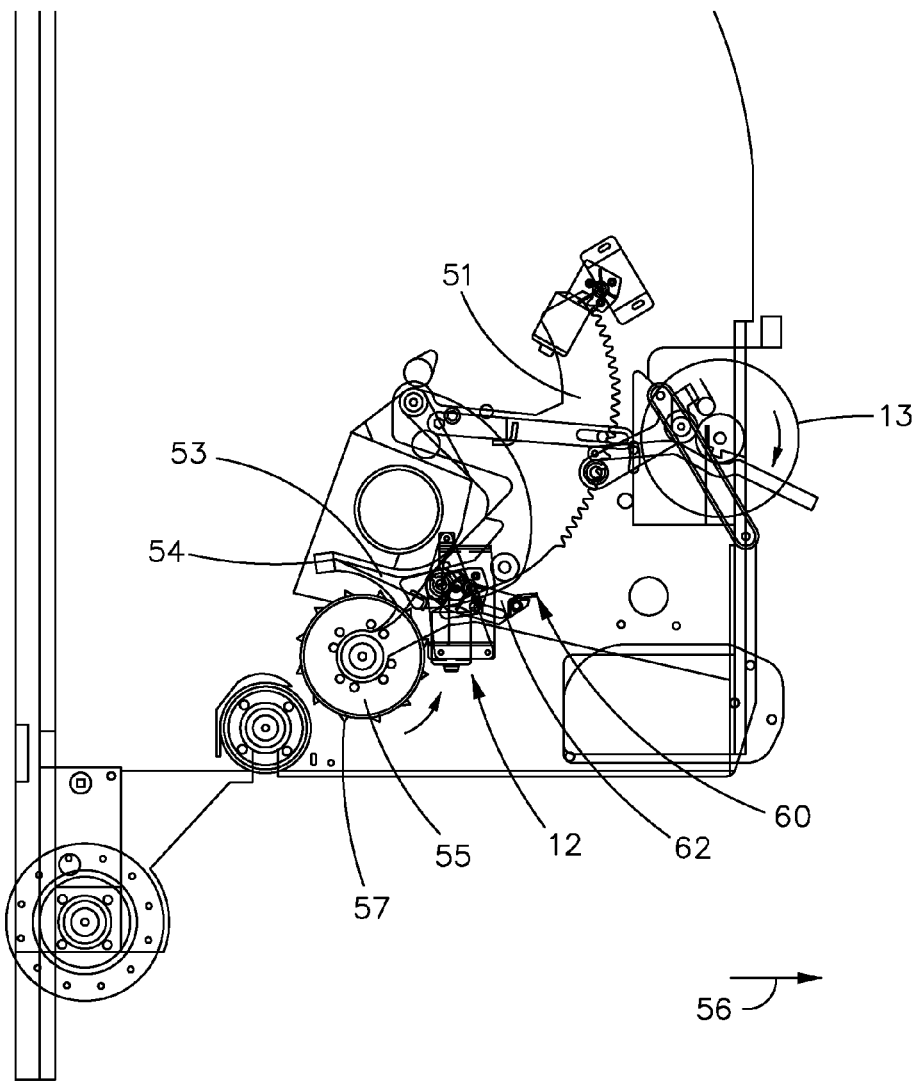
FIG. 3 shows a side cross-sectional view of an exemplary wrapper system with the duckbill in the inserted position and the up-cut net knife in the home position.
Figure 4:
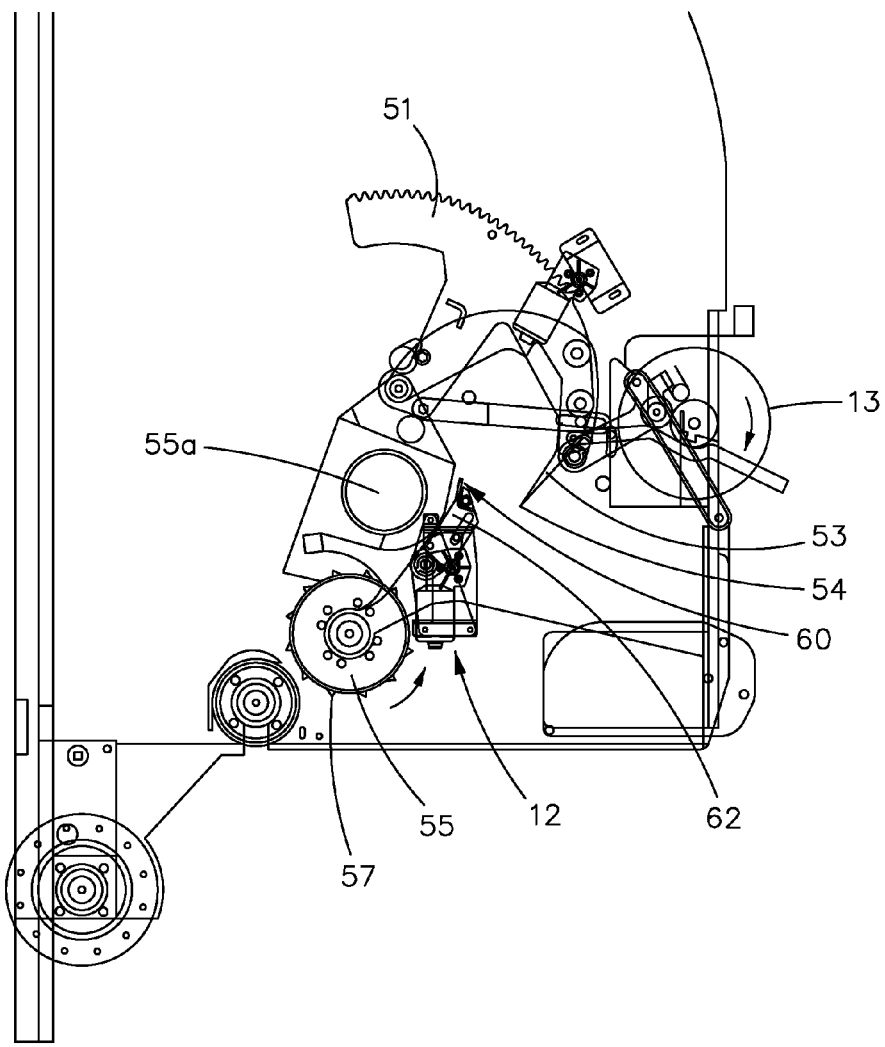
FIG. 4 shows a side view of an exemplary wrapper system and up-cut net knife assembly in the cut position.

FIGS. 2-4 show an exemplary embodiment of the bale wrapping system comprising net dispensing assembly 11 and net cutting assembly 12. As shown, the net dispensing assembly 11 includes a net roll 13, net spreader rolls 50, a duckbill assembly 51, a duckbill motor 52, and duckbill 53. The net cutting assembly comprises an up-cut net knife assembly 12 positioned below the net dispensing assembly 11. In this arrangement, the knife cuts the net from below. Although the embodiments depicted and described herein relate to embodiments cutting the net from below, it should be noted that a similar knife arrangement could be employed for cutting from above, with the opposite movement, so long as the knife moves substantially in the same direction as the net. Turning again to the figures, the up-cut net knife assembly 12 is described in more detail below and with respect to FIGS. 5-7. Bale chamber rolls 55 facilitate the forming of the bale and wrapping of the bale with the net. (Reference numeral 55a is used to denote the location of the axis of a bale chamber roll, which is not shown, for clarity).

The net dispensing assembly 11, including the duckbill 53 and its associated structure and mechanisms may be conventional and common to the structure and operation described in the baler patents referenced and incorporated herein by reference above.

As shown, the net may be fed from the net roll 13 and travel over the net spreader rolls 50 and exit a tip 54 of the duckbill 53. The tip 54 of the duckbill 53 serves to pinch the net and prevent the net from snapping back through the duckbill 53 once it is cut. Typically, a portion of net will extend out of the tip after a net cutting action. For example, it is common for a section of net that hangs out of the tip of the duckbill and that net tail is where it grabs on to the bale when the duckbill is inserted for the next bale wrapping cycle.

As shown, the duckbill motor 52 may be dedicated to the duckbill 53 and operation of the duckbill motor 52 functions to insert the duckbill 53 to commence a net wrapping cycle and then to retract the duckbill 53 at the end of the wrapping cycle once the net has been cut. The net spreader rolls 50 function to define the path of the net as it weaves through the duckbill assembly and to ensure the net is stretched to one side of the bale to the other side of the bale. In the operation of the illustrated net dispensing assembly 11, the net comes off the bottom of the net roll 13, which, in the figure, rotates clockwise, and goes around the upper side of the upper net spreader roll 50 and then makes essentially an 180-degree turn and then goes on the net roll side of the lower net spreader roll 50 and then through the tip 54 of the duck bill 53. The rotational direction of the net roll 13 is unimportant, but will ultimately determines the location where the net leaves the roll, and/or the number and placement of additional rolls needed to direct the net appropriately to the duck bill, and eventually rearward, toward the bale chamber. The front of the baler is indicated by arrow 56.

The bale chamber roll 55 closest to the up-cut net knife assembly 12 may include ribs 57 disposed about the outside of the roll. A bale chamber roller 55 positioned above this roller (not shown) may also include ribs. A gap or clearance may be formed between these two bale chamber rollers 55 to allow access for the tip 54 of the duckbill 53. As the bale chamber roll 55 rotates, the net pinches between the rolls and the bale and ribs 57 help grabs the net and feed it into the bale chamber and onto the bale. In the illustrated embodiment, the bale may rotate such that the top material moves forward and downward, with respect to the baler, clockwise as shown in the figure, in the chamber and the bale chamber rolls 55 rotate in the opposite direction, here counterclockwise.

FIG. 2 shows the net dispensing assembly 11 and up-cut net knife assembly 12 in the home position. FIG. 3 shows the duckbill 53 in the net start or wrap position and the up-cut net knife assembly 12 in an intermediate position—i.e., a position between the home and the cut positions. FIG. 4 shows the net dispensing assembly 11 in the home position and up-cut net knife assembly 12 in the cut position.

As shown in FIGS. 2-4, from the home position, the knife arm 62 of the up-cut net knife assembly 12 rotates upward and rearward, with respect to the baler, counterclockwise as shown in FIGS. 2-4, and the knife 60 travel upward and rearward toward the bale chamber and into the net. The net is also traveling rearward toward the bale chamber. As such, the direction of net travel and the direction of knife travel are both in the same direction. As the knife 60 approaches the cut position, the net and knife are preferably traveling at the same, or substantially the same, speed. In such an embodiment, there is no, or substantially no, relative motion between the net and the knife. Further, since the net and knife are both traveling in the same direction, the net motion helps move the knife into the cut position. In the embodiments shown, the knife is below the net, however, in other embodiments, the knife could be above the net, so long as the net and the knife are moving in substantially the same direction, at least from the point of contact.

A typical bale wrapping cycle and net cutting operation for the embodiment shown in FIGS. 2-4 may operate as follows. In the home position (FIG. 2), the up-cut net knife arm 62 of knife assembly 12 is in the lower or home position and the duckbill 53 of the net dispensing assembly 11 is in the raised or home position. The home position would be typical of the time when a bale is being formed. At some point in time the bale forming operation would be complete and it would be time to wrap the bale. At this time, the duckbill 53 would move to the net start position where the duckbill 53 rotates into the bale chamber as shown in FIG. 3. The duckbill tip 54 fits in between upper and lower bale chamber rolls 55 (the upper roll is not shown for clarity, but its location is marked 55a) and the net is pinched between the bale and the lower roll causing the net to start to feed on to the bale. Sensors (not shown) may be provided to determine when the net is flowing on to the bale. Once it is determined that the bale is properly wrapped, the duckbill 53 is retracted out of the bale chamber and returns to the duckbill home position (see FIG. 4). Completion of the net wrapping may be determined using sensors and/or via passage of a specified time period. At this point in the bale wrapping cycle, the net is still flowing out of the duckbill 53 to the bale chamber. It is also time to cut the net and the knife arm 62 of up-cut net knife assembly 12 is rotated upward and rearward, counter clockwise as shown, to the cut position. When the knife arm 62 reaches the cut position, the knife 60 stops moving and the net is forced or pulled against the knife and the net is cut.

At some point in the travel of the knife arm 62 from the home position to the cut position, the knife 60 would actually come in contact with the net. At this point, the knife blade and net are travelling in substantially the same direction. Embodiments of the up-cut net knife assembly 12 of the present invention have the tip of the knife traveling at the same, or substantially at the same, speed as the net. It is contemplated that the speed of the knife tip and the net may vary slightly, but are traveling at substantially at the same speed so that there is no relative motion between the knife and the net.

For example, in one embodiment, the knife 60 would contact the net at about 50% of its travel between the home position and the cut position. In another embodiment, the knife 60 would contact the net at about 75% of its travel between the home position and the cut position. In each embodiment, it is desirable that the knife tip and net are traveling at the same, or substantially the same, speed when the knife 60 comes into contact with the net. In each embodiment, it is desirable that the knife tip and net are traveling in the same, or substantially the same, direction when the knife 60 comes into contact with the net.

In an ideal situation, the net is cut as soon as the knife 60 gets into the cut position and the net stops being fed. In the cut position, the knife 60 is positioned a distance rearward of the duckbill tip 54 and when the net is cut a net tail remains sticking out of the duckbill 53 and the net tail is essentially the distance between the knife and the tip of the duckbill when the cut is made.

Figure 5:
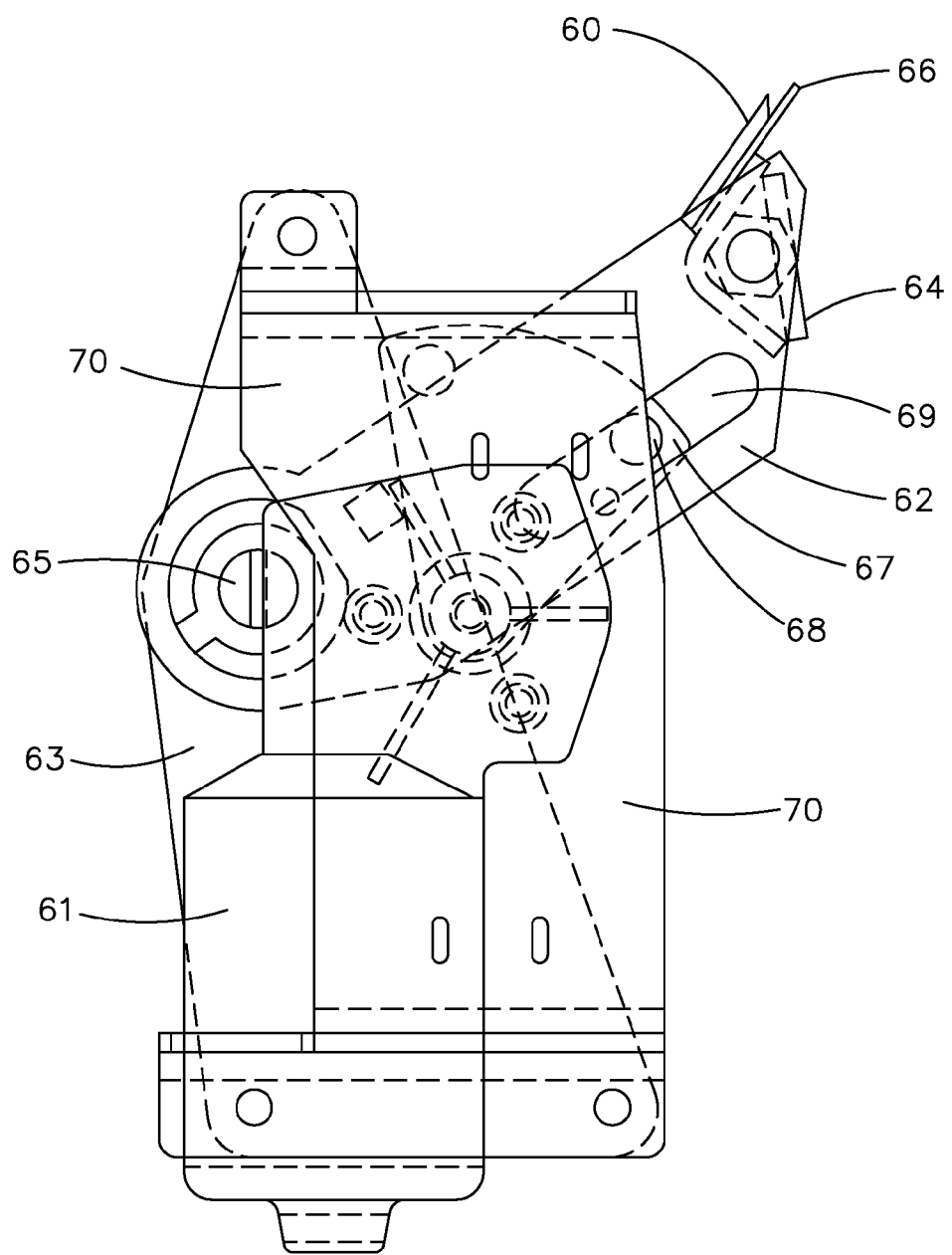
FIG. 5 shows a side view of an exemplary up-cut net knife assembly in accordance with an embodiment of the present invention.
Figure 6:
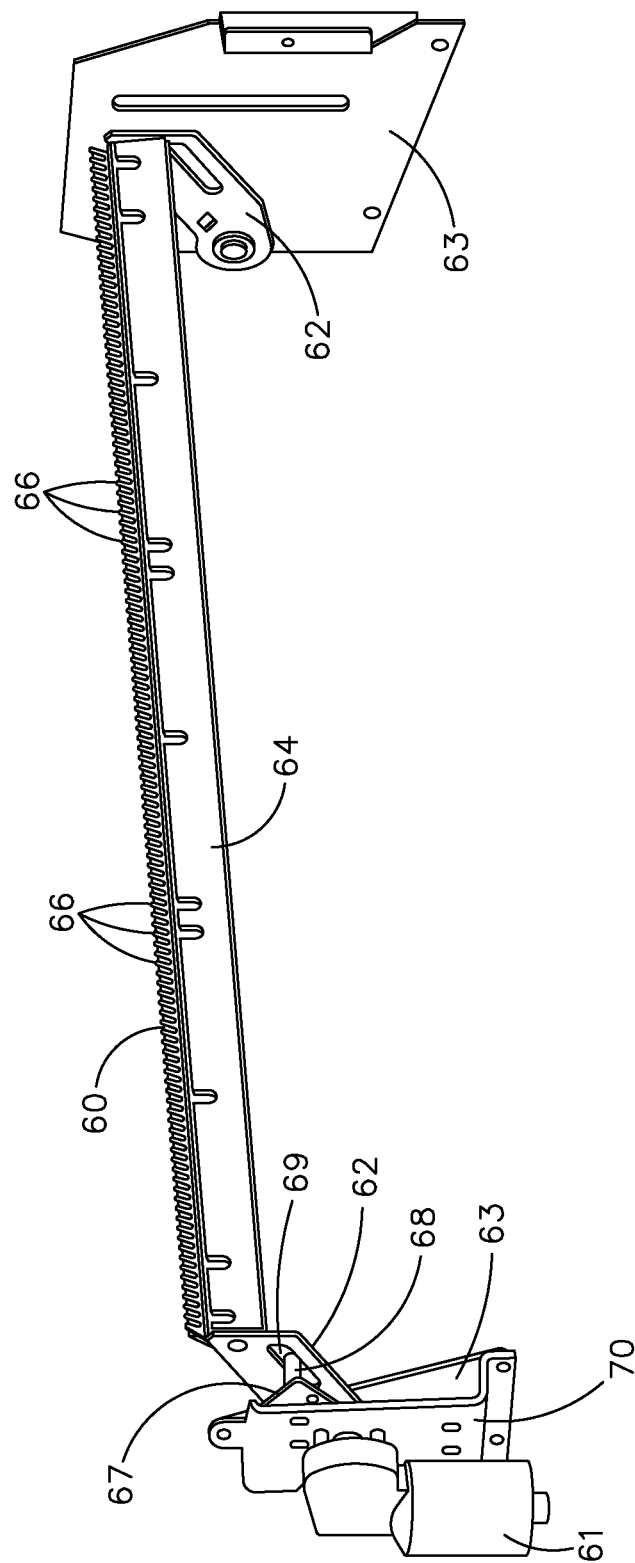
FIG. 6 is a perspective view of an exemplary up-cut net knife bar.
Figure 7:
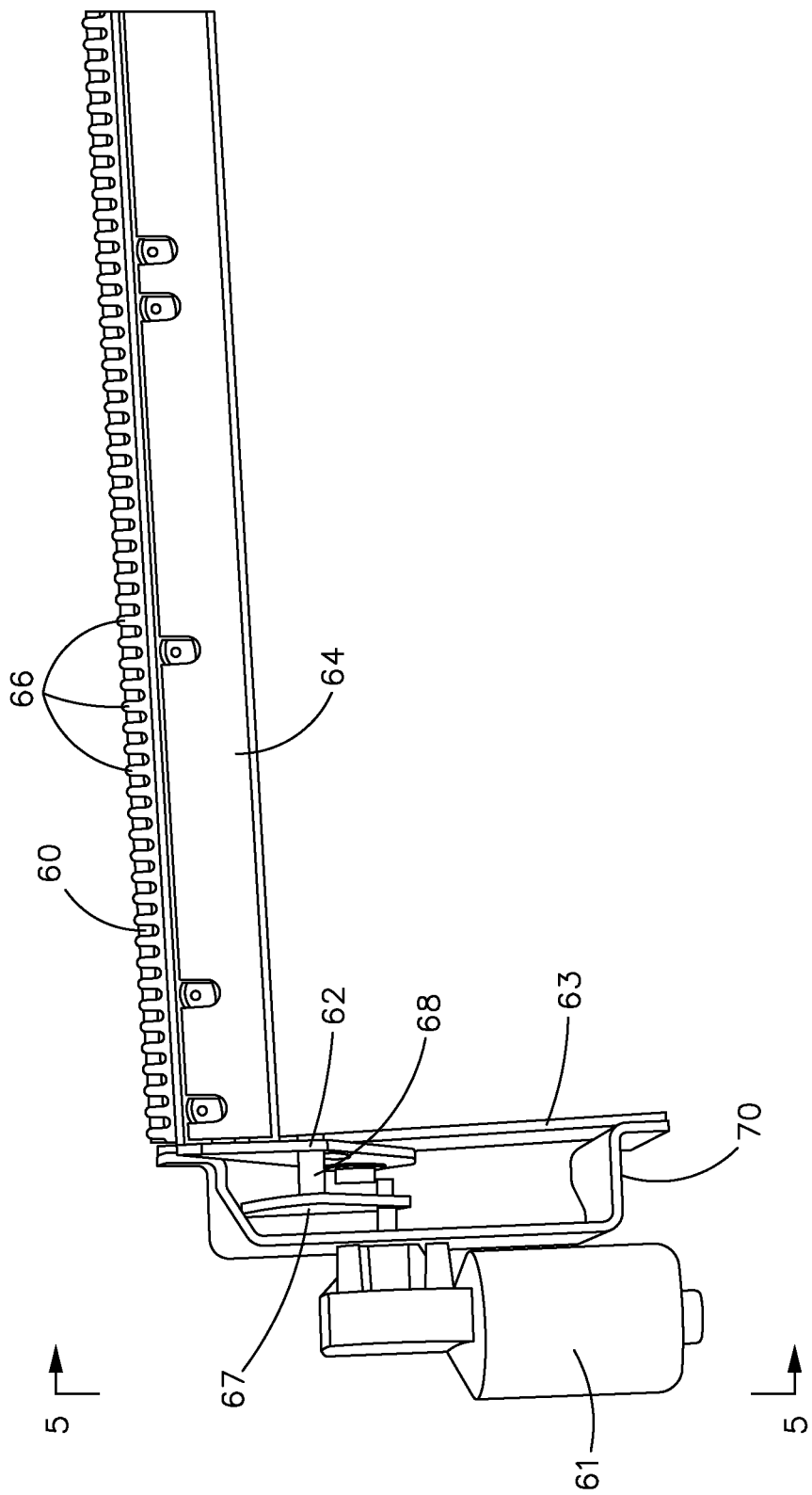
FIG. 7 is perspective view of an exemplary motor/knife interface.

FIGS. 5-7 show details of one embodiment of the up-cut net knife assembly 12. FIG. 5 is a side view of the up-cut net knife assembly 12. FIG. 6 is a perspective view of the up-cut net knife assembly 12 showing an actuator motor 61, knife arms 62, knife arm support plates 63 at each end, and the knife bar 64 extending between the knife arms 62. FIG. 7 is a further detail of the motor/knife interface.

As shown in FIG. 5, the up-cut net knife assembly 12 includes a knife motor 61 operatively coupled to the knife bar 64 and knife 60 via the knife arms 62 at opposite sides of the knife bar 64. In the embodiment shown, the knife motor 61 drives the knife arm 62 about knife pivot 65 causing the knife arm to pivot upward and rearward around an axis of the knife pivot 65. In FIG. 5, this movement is counterclockwise. As shown, knife arms 62 extend between the knife's pivot 65 and the knife bar 64 on each end of the up-cut net knife assembly 12. The knife arms 62 may be rotatably connected to the knife arm support plate 63 at each end. The knife bar 64 is connected (e.g., hinged and bolted) to the knife arm 62. This structure may be formed as a weld assembly, which may be referred to as the knife arm weld assembly. In the illustrated embodiment, two knife arms 62 are provided, one at each end (see e.g., FIG. 6).

The knife 60 may be connected (e.g., bolted) to the knife cross bar or channel 64 that extends transversely between a distal end of the knife arms 62. The knife bar 64 is shown as a rectangle structure in the figures. The knife bar may include, for example, a 90-degree angle bar and a flat plate that may be connected (e.g., bolted, welded, etc.) together to form a channel that the knife 60 may be connected (e.g., bolted) on to.

The up-cut net knife assembly 12 may also include a comb assembly 66 that may be connected (e.g., bolted) on the knife bar 64 underneath the knife 60, as shown. For example, the comb assembly 66 may be pinched between the knife 60 and the knife bar 64. In use, the comb 66 engages the lateral strands of the net to provide tension to those lateral strands in order to allow the cut. Bale wrapping nets typically comprise a woven net having one to two woven strands. While it desirable to have tension at all times, the woven lateral strands may not have tension and therefore a comb 66 may be provided to grab those strands and put tension on them so that they will be cut at the same time as the lateral strands.

As shown, a knife arm driver 67 provides a link between the motor 61 and the knife arm 62. As best shown in FIGS. 5 and 7, the knife arm driver 67 may be connected (e.g., bolted) on to the motor axis and may include a shaft or pin 68 that engages a slot 69 in the knife arm 62. The slot 69 is provided to account for the fact that the axis of the motor is not the same as the axis of the knife, which may allow for a change in the knife arm drive 67 and attached operation, as the electric motor 61 rotates it causes rotation of the to be pin 68. The pin 68 moves downward (toward the motor) in the slot 69 causing the knife 60 to be lowered to the home position. The knife arm driver 67 and attached pin 68 moves up (away from the motor) in the slot 69 causing the knife 60 to be raised toward the cut position.

The knife arm support plates 63 may be connected to the main frame of the baler 10 so the knife arm support 63 may carry the weight of the up-cut net knife assembly 12. A motor support 70 may be provided to support the knife motor assembly 61. As shown, the motor support 70 may include an angle bracket that connects to the knife arm support plate 63. The up-cut net knife assembly 12 may include a single motor at one end, as shown, or two motors—one at each end.

FIGS. 8-13 show another embodiment of the up-cut net knife assembly 12a. In the embodiment illustrated in FIGS. 8-13 the actuator or motor 61 of the up-cut net knife assembly 12a is operatively coupled to the knife 60 using mechanical linkage. Like the previously described embodiments, the up-cut net knife does not require high speed or high impact to cut the net due to the direction of travel of the knife (same direction of travel as the net).

Figure 8:
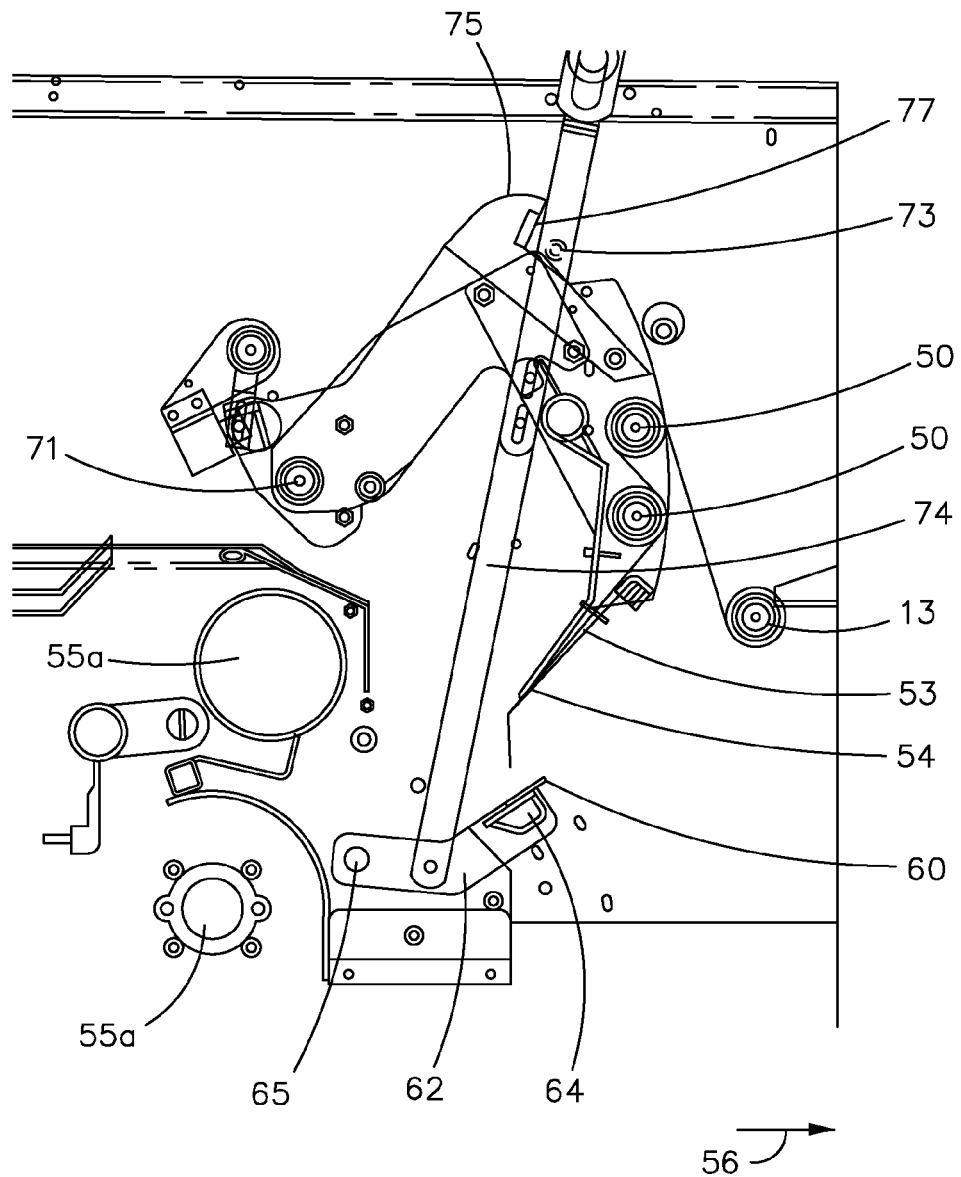
FIG. 8 shows another embodiment with the duckbill and up-cut net knife in the home position.

FIGS. 8-11 are right side views of the net dispensing assembly 11 and up-cut net knife assembly 12a in various positions. FIG. 8 shows the duckbill 53 of the net dispensing assembly 11 and up-cut net knife assembly 12a in the home position. In the illustrated embodiment, the net dispensing assembly 11 and up-cut net knife assembly 12a extend transversely across the baler. As shown, the duckbill 53 includes a duckbill pivot 71 and the net tail is extending slightly from the duckbill 53. The knife bar 64 is positioned below the duckbill 53 and includes a knife bar pivot 65.

Figure 9:
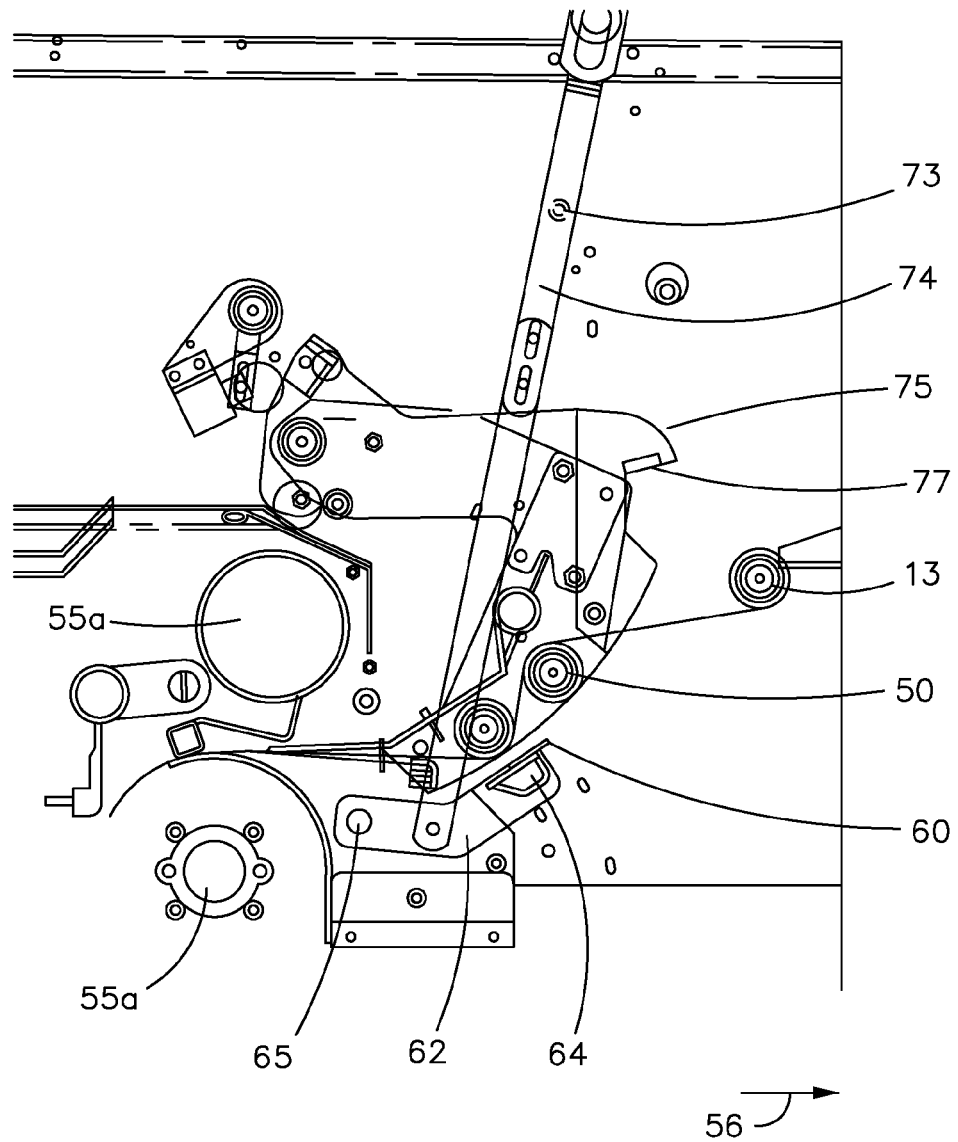
FIG. 9 shows the embodiment of FIG. 8 with the duckbill in the insert position.
Figure 10:
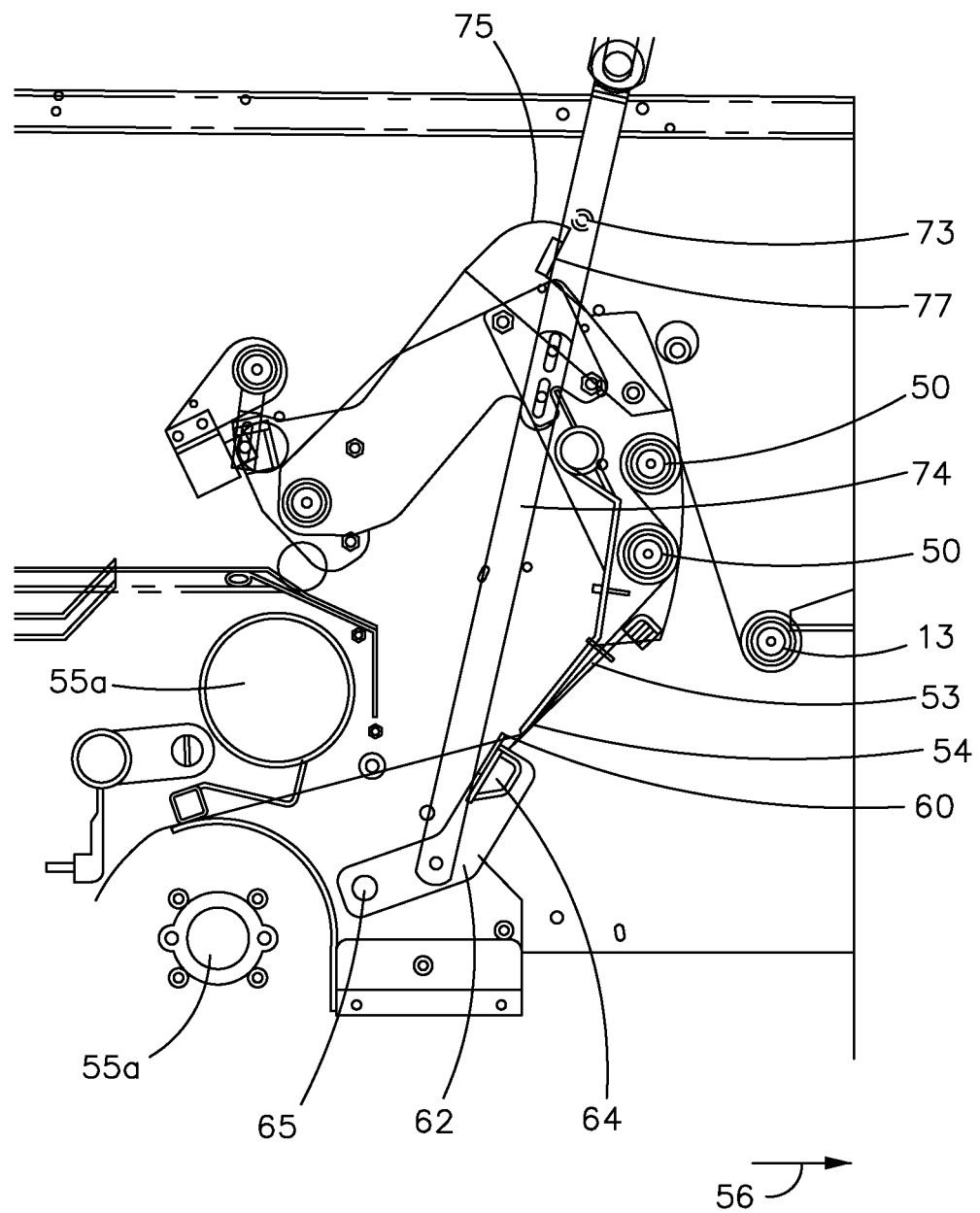
FIG. 10 shows the up-cut net knife in an intermediate position in its travel toward the cut position.
Figure 11:
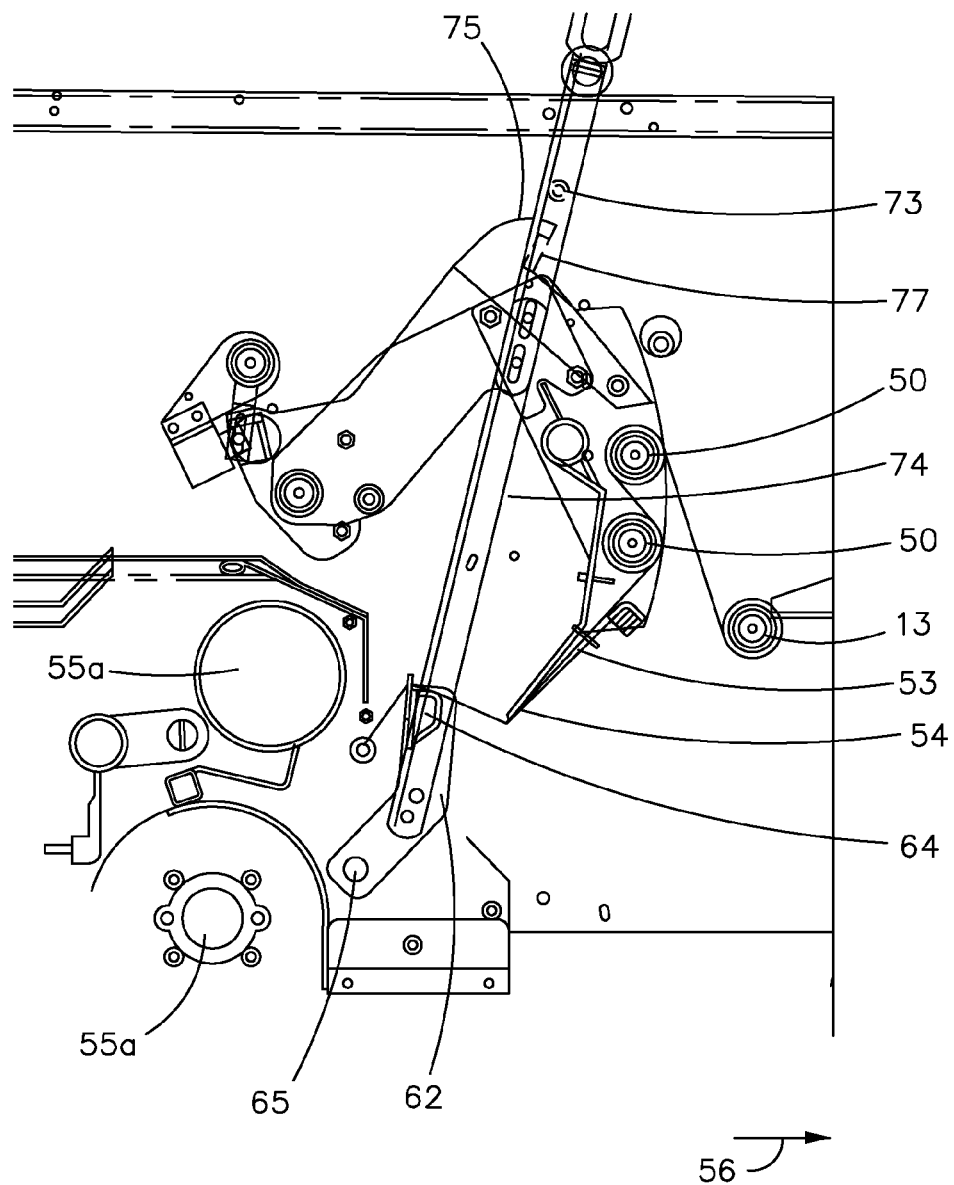
FIG. 11 shows the up-cut net knife bar raised up and contacting the net in the cut position.

When the bale wrap cycle begins, the duckbill 53 rotates downward, clockwise as shown, about the duckbill pivot 71 to the insert position, as shown in FIG. 9. The net tail is pinched between the bale and some of the rollers 55, 55a in the bale chamber and the net begins to wrap the bale. When the net starts to wrap the bale, the duckbill rotates upward, counterclockwise as shown, about the duckbill pivot 71 out of the bale chamber to a wrapping position. As shown in FIG. 10, when enough wrap has been placed on the bale, the duckbill rotates further upward, counterclockwise as shown, so that the cam follower 73 on the knife trip linkage 74 contacts the cam surface 75 and begins to rotate the knife bar 64 upwards, counterclockwise as shown.

The knife bar 64 raises up toward the net and eventually comes in contact with the net being fed into the bale chamber. Advantageously, the moving net helps rotate the knife bar 64 to the cut position, as shown on FIG. 11. Preferably, the tip of the knife 60—i.e., the cutting surface of the knife 60—is moving at substantially the same speed as the net so that there is no, or substantially no, relative motion between the cutting surface of the knife 60 and the net. Eliminating or minimizing any relative motion between the net and the knife 60 may be accomplished by timing the movement of the knife 60, in this case the pivoting motion of the knife bar 64, to the feed speed of the net. Eliminating or minimizing any relative motion between the net and the knife 60 helps produce a cleaner and straighter net cut. Some deflection of the net may occur as the knife 60 contacts the net. Preferably, whatever contact point the knife 60 initially makes with the net is maintained for the rest of the knife motion until the net is cut across the entire width of the duckbill 53.

In the cut position, the knife 60 is at the appropriate angle to cut the net, and the net cut is made. For example, the knife angle relative to the net may be close to perpendicular. From the moment the net grabs the knife 60 and knife bar 64 until the net is cut, there is substantially no relative motion between the net and the knife 60. This helps reduce wear on the knife. Also, by utilizing the net motion to help move the knife to the cut position, less energy is required from the actuator(s) controlling the duckbill and knife bar. While the net is being cut, the duckbill continues rotating upward (counterclockwise as shown) to the home position. After the net has been cut, the knife bar drops to its home position where the duckbill is ready to be inserted for the net wrap cycle.

Figure 12:
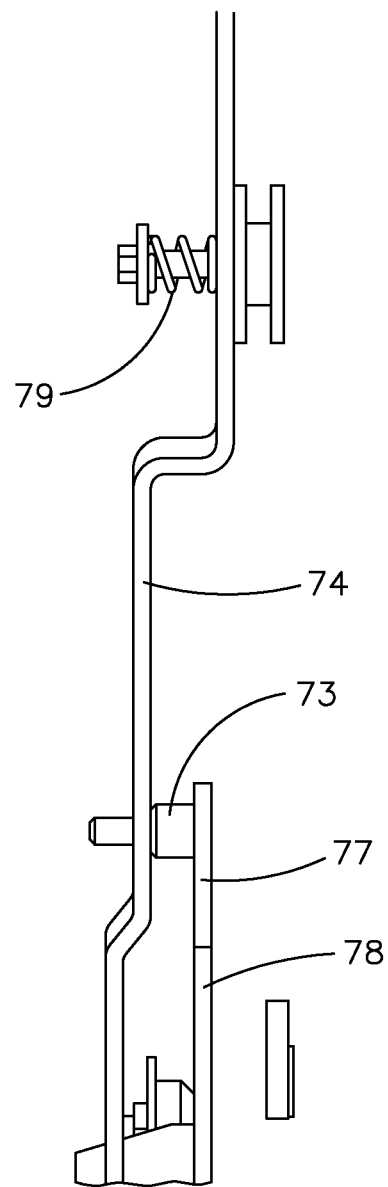
FIG. 12 shows the up-cut net knife bar in it home position.
Figure 13:
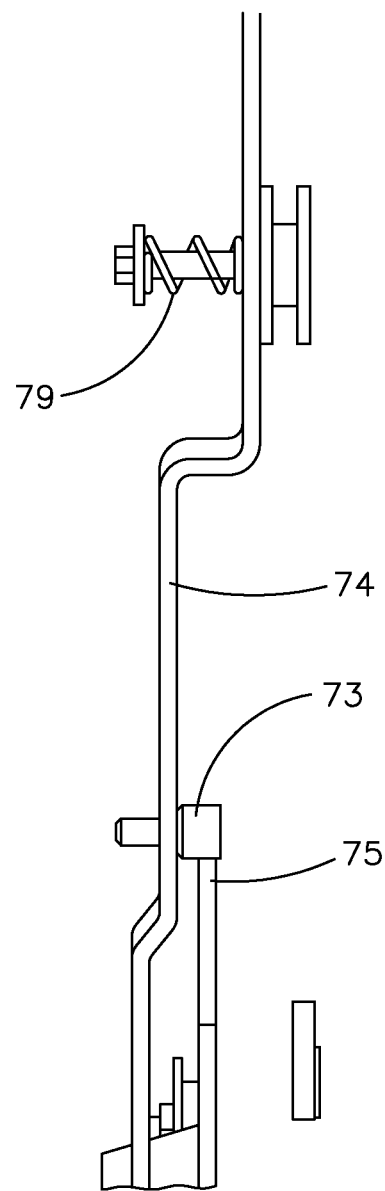
FIG. 13 shows the up-cut net knife trip link returned to the engaged inward position which occurs as the duckbill moves toward the insert position.

When the duckbill 53 is inserted to start the net wrap process, the knife bar 64 preferably remains at its home position. In order to facilitate this movement, the cam follower 73 may be disengaged from the cam track 75, as shown in FIG. 12. A cam follower ramp 77 located on the duckbill side plate 78 may move the cam follower 73 and knife trip linkage 74 away from the duckbill 53 as the duckbill moves downward (clockwise as shown) from the home position. As shown in FIG. 13, as the duckbill 53 continues to move to the insert position, the duckbill side plate 78 moves past the cam follower 73, and a spring 79 may return the knife trip link 74 to the engaged inward position.

EXAMPLES

It has been demonstrated the use of an up-cut net knife assembly in accordance with embodiments of the present invention allow the net to be cut at lower knife speeds and using less energy. For example, conventional knife net cutting assemblies require "high-speed impact cut." High speed impact cutting typically uses a spring loaded knife. The torque on the knife bar from the spring is typically greater that about 20 Nm, which results in knife tip speeds greater than about 5 m/s. The disclosed up-cut net knife assembly only requires the knife tip speed to travel at the net surface speed which is about 2 m/s. This speed can be achieved by applying a torque of less than about 10 Nm.

It has been also been demonstrated the use of an up-cut net knife assembly in accordance with embodiments of the present invention require "less energy" to perform the cut. For example, conventional knife net cutting assemblies requires an electric motor to actuate the knife with a current of greater than about 30 Amps. The disclosed up-cut net knife assembly can be powered by an actuator requiring less than about 25 Amps. This is due, at least in part, to previously mentioned torques/speed requirement noted above. This is also attributed to the fact that the configuration of the up-cut net knife assembly results in the net motion helping the knife get to the cut position.

It has been further been demonstrated the use of an up-cut net knife assembly in accordance with embodiments of the present invention require "less net tension" to perform the cut. The up-cut net knife assembly requires more than 20% less tension to cut the net than current production systems. Typical net tensions are between 50 and 200 lbs.

Although the invention has been described with reference to exemplary embodiments, it is not limited thereto. For example, it is foreseeable that the up-cut net knife could be used in cutting twine on round and square balers. Those skilled in the art will appreciate that numerous changes and modifications may be made to the preferred embodiments of the invention and that such changes and modifications may be made without departing from the true spirit of the invention. It is therefore intended that the appended claims cover be construed to all such equivalent variations as fall within the true spirit and scope of the invention.

What is claimed is:

1. An agricultural baler net wrapping system comprising:
   a net dispensing assembly comprising:
      a supply roll comprising a cylindrical body extending transversely across said agricultural baler, said supply roll holding a net material;
      a duckbill for receiving net from the net roll and feeding net material into a bale chamber, said duckbill being moveable between a home position, and an insert position;
      one or more bale chamber rolls proximate a bale chamber for receiving net from the duckbill;
      a direction of net travel of said net from said duckbill toward said bale chamber;
   a knife assembly, said knife assembly comprising:
      knife arms positioned proximate side walls of said agricultural baler, said knife arms having knife pivots allowing the knife arms to rotate about a transverse axis, said knife arms having distal ends;
      a knife bar holding a knife having a cutting edge, said knife bar and knife extending transversely across said agricultural baler and connected to said distal ends of said knife arms;
      a motor operatively coupled to at least one of said knife arms to cause said rotational movement of said up-cut knife assembly between a home position, and a cut position; and
      a direction of knife travel of said knife cutting edge, wherein the direction of said knife travel is configured to align in substantially the same direction as said net travel to the cut position, wherein in the cut position the material and knife are moved into cutting contact.

2. The agricultural baler net wrapping system of claim 1, whereby the motion of the net helps the knife get into the cut position.

3. The agricultural baler net wrapping system of claim 1, wherein, upon contact, the knife cutting edge moves at substantially the same speed as the net material so that there is substantially no relative motion between the knife cutting edge and the net material until the knife gets into the cut position.

4. The agricultural baler net wrapping system of claim 1, wherein in the cut position, the knife stops and the net pulls against the knife blade causing the net to shear.

5. An up-cut net knife assembly for a wrapping material assembly of a baler comprising:
   an elongated knife arm rotatable about a transverse pivot axis and having an end distally located from said pivot axis;
   a knife bar extending transversely to and affixed to said distal end of said knife arm;
   a knife blade extending along and affixed to said knife bar, such that said knife blade defines a cutting edge facing distally substantially in the longitudinal direction of said knife arm;
   a knife arm driver operatively coupled to said knife arm for rotating said knife arm about said transverse pivot axis between a lower home and an upper cut position, said rotational movement moving said knife blade and said cutting edge along an arc path about transverse pivot axis wherein the arc path is at least partially concurrent with a feed path of material such that during a wrapping operation the material and knife are both traveling generally simultaneously in the same direction toward a bale chamber of the baler as the knife moves to the upper cut position.

6. The up-cut net knife of claim 5, wherein the knife arm driver is operably coupled to a motor for facilitating movement of said knife arm driver.

7. The up-cut net knife of claim 5, further comprising two elongated knife arms each rotatable about a transverse pivot axis and having an end distally located from said pivot axis, wherein:
- said knife bar extends transversely between said distal ends of said two elongated knife arms, and
- wherein at least one of said knife arms is operably coupled to said knife arm driver.

8. The up-cut net knife of claim 5, wherein said knife arm is adapted for rotatable fixation to a sidewall of an agricultural baler apparatus.

\* \* \* \* \*